United States Patent [19]

Loesch

[11] Patent Number: 4,551,185

[45] Date of Patent: Nov. 5, 1985

[54] METHODS OF AND APPARATUS FOR MAKING RETRACTILE CORDS

[75] Inventor: Robert P. Loesch, Omaha, Nebr.

[73] Assignee: AT&T Technologies, Inc., Berkeley Heights, N.J.

[21] Appl. No.: 466,743

[22] Filed: Feb. 15, 1983

[51] Int. Cl.[4] ............................................. C21D 1/32
[52] U.S. Cl. .................................... 148/150; 174/69; 425/391; 140/140
[58] Field of Search ................ 140/140; 425/391, 334; 148/150; 29/868; 174/69; 264/281

[56] References Cited

U.S. PATENT DOCUMENTS

| | | | |
|---|---|---|---|
| 2,394,762 | 2/1946 | Geraty | 29/868 X |
| 2,452,432 | 10/1948 | Collins | 264/281 X |
| 2,920,351 | 1/1960 | Hardesty et al. | 174/69 X |
| 3,016,571 | 1/1962 | Adams | 425/334 X |
| 3,151,635 | 10/1964 | Levine | 140/140 X |
| 3,184,795 | 5/1965 | Howell, Jr. | 425/391 X |
| 3,226,767 | 1/1966 | Howell, Jr. | 425/391 X |
| 4,375,012 | 2/1983 | Cocco et al. | 174/69 |

OTHER PUBLICATIONS

Western Electric Tech Digest, No. 50, Apr. 1978, pp. 13-14, "Straightening End Portions of Retractile Cords", by R. P. Loesch.

Primary Examiner—Howard N. Goldberg
Assistant Examiner—Carl J. Arbes
Attorney, Agent, or Firm—E. W. Somers

[57] ABSTRACT

A leading end portion (33) of a supply of cordage (31) is clamped to a mandrel (32) such that it is straight, after which a plurality of convolutions of the cordage are wound on the mandrel. The cordage is severed from the supply and a trailing end portion (34) of the wound cordage is clamped to the mandrel in a manner which causes it to be straight and hence suitable for termination with a modular plug (37). The coiled cordage is heated and cooled and is then removed from the mandrel while simultaneously the direction of the helices is reversed. Then the cordage is severed at a predetermined location to produce two retractile cords, for example, one including the leading end portion of the length of wound cordage and a newly formed straight trailing portion. The second cord includes a newly formed straight leading end portion and the initial trailing end portion. The newly formed end portion of each cord is caused to be held in a straight configuration and annealed to cause it to retain that configuration. This facilitates the termination of the newly formed end of each cord and allows automatic cord-making apparatus to be used to make cords of varying lengths.

4 Claims, 20 Drawing Figures

FIG. 1
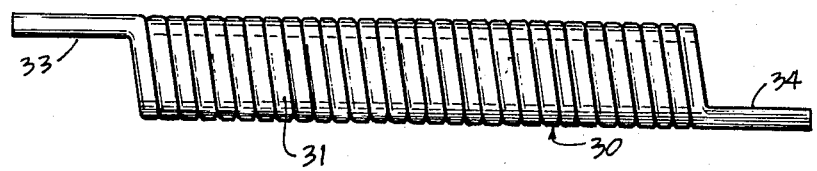
FIG. 1A
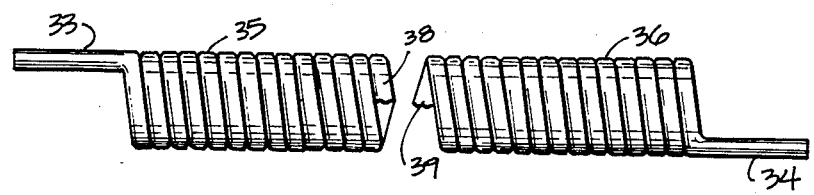
FIG. 1B
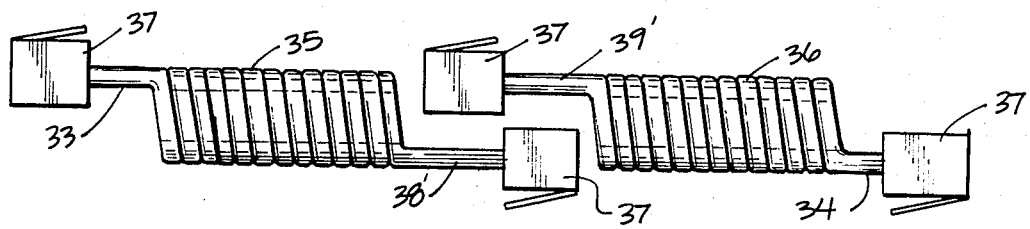
FIG. 1C
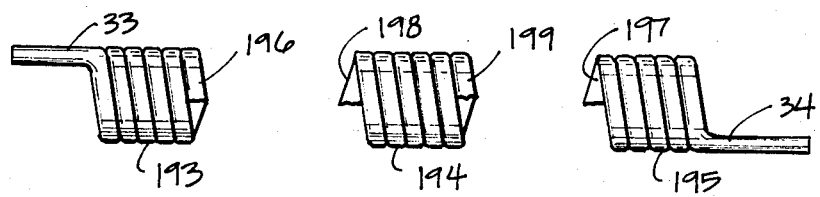
FIG. 1D
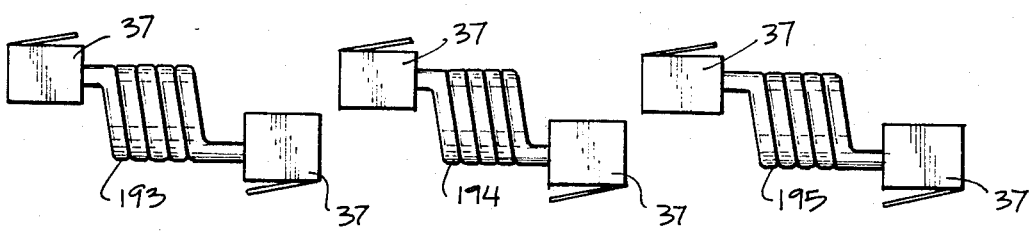
FIG. 1E 4,551,185

METHODS OF AND APPARATUS FOR MAKING RETRACTILE CORDS

TECHNICAL FIELD

This invention relates to methods of and apparatus for making retractile cords, and more particularly, to methods of and apparatus for making retractile cords in a manner which facilitates termination of their end portions.

BACKGROUND OF THE INVENTION

Retractile telephone cords, commonly referred to as spring cords, are widely used in the communications industry. For example, retractile cords are used to connect the handset and base portions of a telephone instrument. The retractile cord is manufactured with the major portion thereof in the form of a compact helical cord, which may be extended by tension and which will return to the compact form when the tension is relieved. A disclosure of the structure of a retractile cord appears in U.S. Pat. No. 3,037,068 which issued on May 29, 1962 to H. L. Wessel and in U.S. Pat. No. 4,090,763 which issued on May 23, 1978 in the names of W. I. Congdon et al.

At one time, the manufacture of spring cords involved an operator who caused cordage to be fed from a fixed feed-in point and coiled onto a longitudinally moving mandrel. Afterwards, a plurality of the mandrels were stacked in a rack which was conveyed through an oven and then through a cooling chamber. Subsequently, another operator placed each of the mandrels in an apparatus and then caused the removal of each cord from its mandrel in such a manner as to reverse the direction of the helical wind of the cord. This caused the retractile cord to have a permanent and improved retractility.

There was a long felt need for an apparatus that could be used to produce uniformly coiled retractile cords having uniform characteristics at a high rate of production with minimum floor space. That need was satisfied by the invention disclosed and claimed in U.S. Pat. No. 3,988,092 which issued on Oct. 26, 1976 in the names of G. F. Bloxham et al. In accordance with that invention, a leading end of each of a plurality of cordage supplies is advanced into clamping engagement with an associated mandrel of one of a pluraliy of workholders mounted on a conveyor. Cordage is wound in convolutions on each mandrel in a cord-coiling station after which the wound cordage is severed from its supply. Leading and trailing end portions of each cord are clamped to a mandrel in a manner so that they are straight. The group of coiled cords is indexed through a heating zone whereat the mandrels are preheated to supplement subsequent exposure of the wound cords to radiant heat. Simultaneously, the next successive one of the workholders is advanced into the cord-coiling station to have cordage wound on each of its mandrels. The group of coiled cords is advanced through a cooling zone and to a remove-reverse station whereat each cord is removed from its mandrel in a manner to reverse the direction of helical wind and thereby improve the rectractile properties of the cords. After the cords have been removed from the mandrels, the leading and trailing end portions of each cord retain their straight configuration and thereby facilitate termination with a modular plug.

It should be appreciated that the above-described apparatus is designed to manufacture a retractile cord having a fixed length. Significant changes would be necessary to adapt it to the manufacture of different length cords. Moreover, these changes would not be made easily between production runs. What is needed and seemingly what is not available is a method of making a family of lengths of retractile cords. Hopefully, this could be accomplished in cooperation with the above-described apparatus which efficiently manufactures fixed length cords.

SUMMARY OF THE INVENTION

The foregoing need has been met by the methods and apparatus of this invention. A length of retractile cordage is made by helically winding a plurality of convolutions of cordage on a workholder such that leading and trailing end portions of the cordage are straight and are secured to the workholder. The coiled length of cordage is heated and cooled after which the cooled cordage is removed from the workholder while the direction of the helical wind is reversed. Then, in accordance with the invention, the length of cordage is severed at a predetermined location between its ends of form at least a first retractile cord having the straight leading end portion and a newly formed trailing end portion, and a second retractile cord having the straight trailing end portion and a newly formed leading end portion. Then the newly formed end portions are annealed to cause each cord to have straight end portions which are suitable for termination with a modular plug.

In a preferred embodiment, each cord is positioned on a turntable with its newly formed end portion releasably held in a clamping pallet. The end portions are maintained in a straight configuration by the pallet as the turntable is indexed to move each cordage end portion through a heating apparatus. The heating apparatus is such that the heating of each cord is confined substantially to its newly formed end portion. Afterwards, each cord end portion is cooled. Advantageously, the annealed end portion of each cord retains its straight configuration and is suitable for termination with a modular plug.

BRIEF DESCRIPTION OF THE DRAWINGS

Other objects and features of the present invention will be more readily understood from the following detailed description of specific embodiments thereof when read in conjunction with the accompanying drawings, in which:

FIGS. 1A–1E are a series of views which illustrate the methods of this invention;

FIG. 9 is an end elevational view taken along lines 9—9 of FIG. 4 and showing facilities for operating facilities for clamping trailing end portions of the wound cordage;

DETAILED DESCRIPTION

The methods and apparatus of this invention are effective to provide retractile cords from a length 30 (see FIG. 1A) of cordage 31 with each cord having a straight portion at each of it ends. The structure of a retractile telecommunications cord is well disclosed in priorly-identified U.S. Pat. No. 4,090,763, which is incorporated by referenced hereinto.

Figure 2:
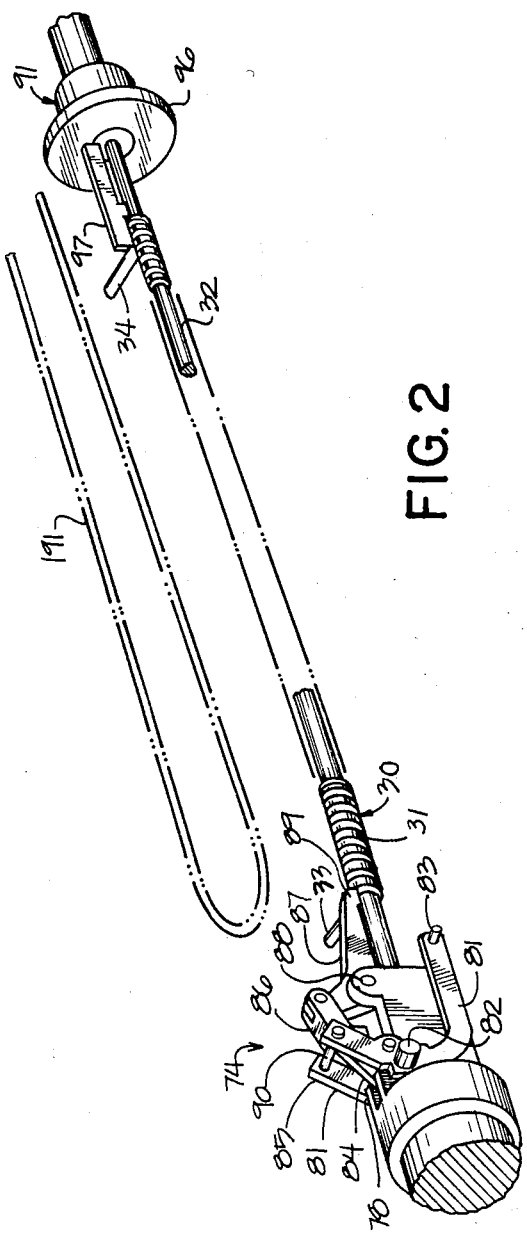
FIG. 2 is a perspective view of a mandrel having cordage wound thereon and showing facilities for clamping each end of the cordage.

In accordance with the methods of this invention, the length 30 of retractile cordage 31 is formed on a mandrel 32 (see FIG. 2) and has a straight leading end portion 33 and a straight trailing end portion 34. The length 30 is severed at least at one predetermined location to provide two retractile cords 35 and 36 (see FIG. 1B). In order to terminate a retractile cord with a modular plug 37 (see FIG. 1C) such as that disclosed in U.S. Pat. No. 4,158,316 which issued on Apr. 16, 1978 in the name of E. C. Hardesty, it is necessary to provide a straight end portion. As can be seen in FIG. 1B, after the length 31 of cordage has been severed, newly formed end portions 38 and 39 which are adjacent of the line of cut are not straight. In accordance with this invention, the end portions 38 and 39 are caused to become straightened as end portions 38' and 39' (see FIG. 1C).

An apparatus such as one which is designated generally by the numeral 40 (see FIG. 3), may be provided for continuously manufacturing lengths 30—30 of retractile cordage 31 (see FIG. 2), each of which is wound in a helix along the length of a rotating mandrel 32. A plurality of the mandrels 32—32 are grouped to form a workholder 42, a plurality of which are mounted on an endless conveyor 41 supported in a frame 43. As each workholder 42 is indexed into a cord-coiling station 44, a length 30 of cordage is wound on each mandrel 32 of the workholder. Then the workholder 42 is advanced through a mandrel-preheat station 45 and a cord-heating station 46. The cordage 31 is heated to a temperature above the softening point of the jacketing composition to relieve strains in the jacketing material and to impart a helical set to the cord, after which the cordage is cooled to room temperature at a cord-cooling station 47. Afterwards at a cord-removal and reversal station 49, the heat-treated cordage is removed from the mandrels 32—32 and the direction of the helical wind is reversed in order to provide a retractile cord having a greater retractility. The apparatus 40 is disclosed and claimed in priorly identified U.S. Pat. No. 3,988,092 which is incorporated by reference hereinto.

Figure 3:
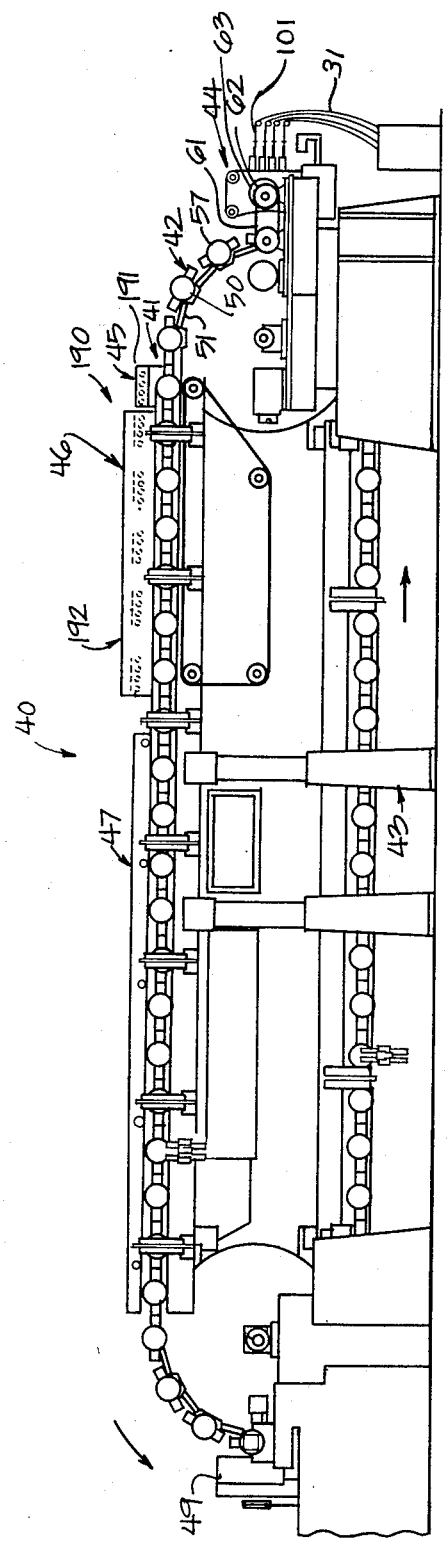
FIG. 3 is an elevational view illustrating a portion of apparatus for carrying out this invention for manufacturing retractile cords.
Figure 4:
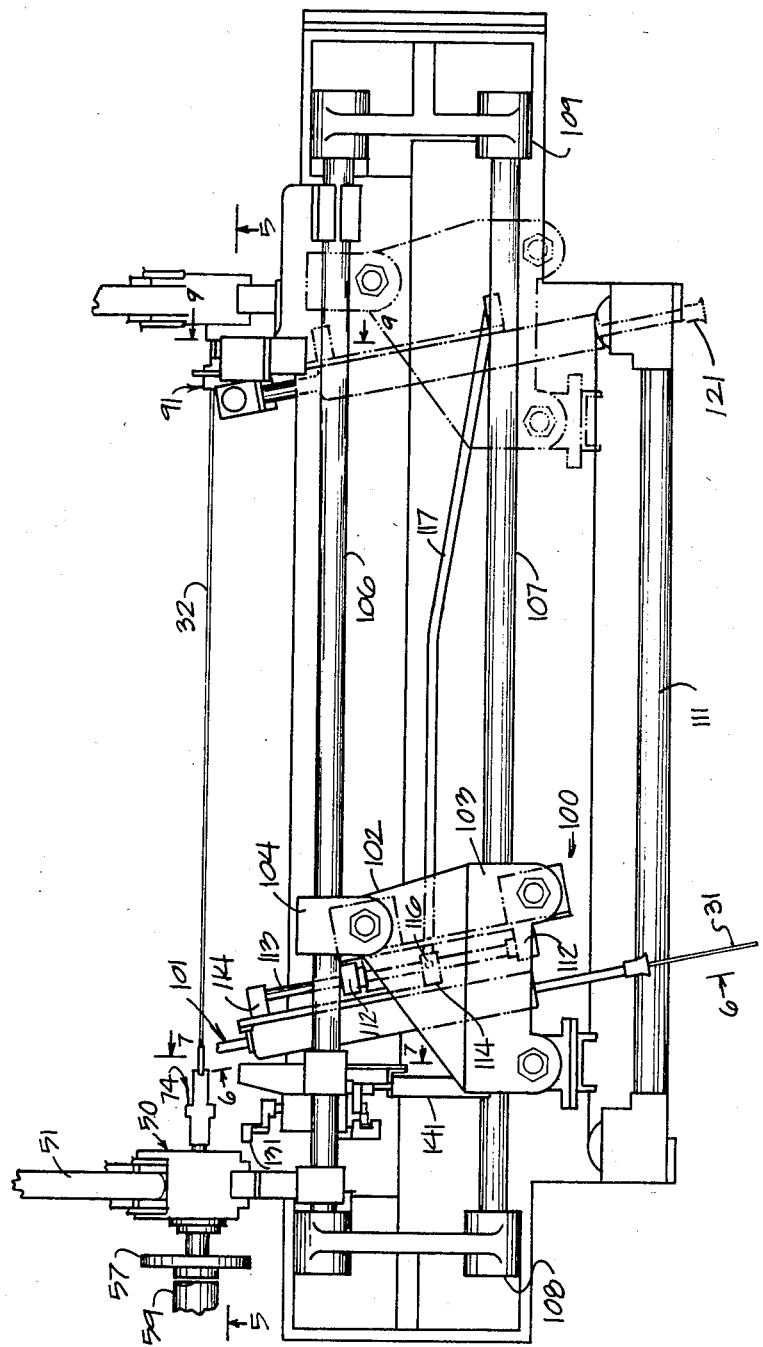
FIG. 4 is a plan view taken at the right-hand end of FIG. 3 to show details of cord-coiling facilities of the apparatus of FIG. 3.

Referring now to FIGS. 3 and 4, it can be observed that adjacent pairs of links 51—51 of the conveyor 41 are connected to a drive head 50 of one of the workholders 42—42. The head 50 includes a bearing 54 (see FIG. 5) having a drive shaft 56 extending therethrough with an outer end thereof connected to a sprocket 57. The sprocket 57 is adapted to be engaged by a clutch face 59 which is turned rotatably by a belt 61 (see FIG. 3) that is passed over a pulley 62 of a motor 63.

Figure 5:
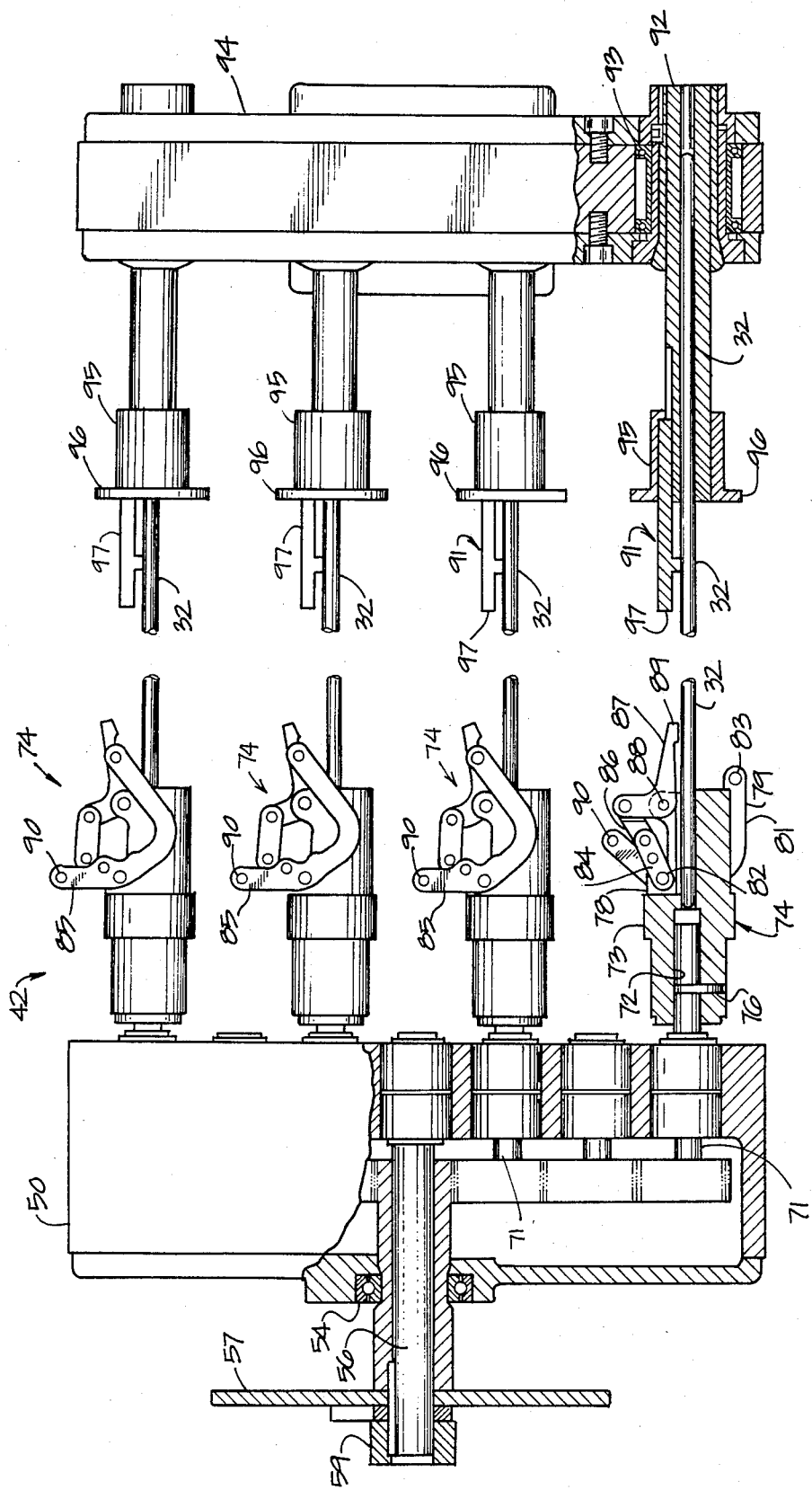
FIG. 5 is an elevational view taken along lines 5—5 of FIG. 4 and showing a group of mandrels of a workholder in a cord-coiling station.

Turning now to FIG. 5, there is shown a workholder 42 as it appears in the cord-coiling station 44. As can be seen, it comprises a plurality of mandrels 32—32. The drive shaft 56 extends into the head 50 and is attached to a gear drive train. A plurality of shafts 71—71 extends through gearing and bearings and then externally of the head 50. Each of the shafts 71—71 supports one end of a mandrel 32 on which cordage 31 is to be coiled. An end of each of the shafts 71—71 is secured within a stepped bore 72 of a housing 73 of an associated toggle clamp assembly 74 by a fastener 76. One end of an associated mandrel 32 on which the cordage is to be coiled is received in a press fit in the other end of the stepped bore 72.

The toggle clamp assembly 74 has provisions for clamping a leading end portion of cordage 31 which is wound on the associated mandrel 32. A pair of spaced arms 81—81 (see FIGS. 2 and 5) are mounted pivotally to a bifurcated portion 78 of the housing 73 by a shaft 82 with one end 79 of each of the arms having a stud 83 extending laterally thereof. Further, as can be seen by the lower one of the toggle clamp assemblies in FIG. 5, a link 84 is connected to the shaft 82 and pin-connected to an H-shaped link 86. The link 86 is pin-connected to an L-shaped lever 87, which is mounted pivotally to the housing 73 by a pin 88. An end 89 of the lever 87 is effective to clamp a leading end of the cordage 31 in engagement with the mandrel 32. Opposite ends 85—85 of the arms 81—81 are connected by a pin 90.

The opposite end of each mandrel 32 extends through an end-of-coiling clamp assembly 91 (see FIGS. 2 and 5) into a sleeve 92 mounted rotatably in a bearing 93 of a support head 94. The support head 94 is interconnected to adjacent ones of the plurality of links on the opposite side of the conveyor 41. A portion 95 of the clamp assembly 91 includes a flanged hub 96 having one portion 97 which extends beyond the end of the sleeve. The portion 97 of the clamp assembly 91 is adapted to be moved to an operative position over a last one or ones of the convolutions of the cordage 31 wound on the mandrel 32. As this occurs, severing facilities to be described hereinafter are controlled to form a trailing end portion for the cordage 31 wound on the mandrel 32.

Apparatus designated generally by the numeral 100 (see FIG. 4), is provided in the cord-coiling station 44 for causing the cordage 31 from each of a plurality of supplies to be coiled onto the mandrels 32—32 of each workholder 42 which is advanced into the cord-coiling station. The cord-coiling apparatus 100 includes a cordage-feeding device 101 associated with each mandrel 32 and mounted on a carriage 102, which is supported by brackets 103 and 104. The brackets 103 and 104 are mounted slidably on parallel rods 106 and 107 that are supported in end bearings 108 and 109. The carriage 102 is adapted to be moved along the length of the workholder 42 in the cord-coiling position by a cable cylinder arrangement 111. The carriage 102 includes a pair of spaced bearings 112—112 for supporting slidably a rod 113. The rod 113 also extends through a pair of spaced bearings 114—114 which are attached to and moveable with the rod. Further, one of the bearings 114—114 includes a stud follower 116 which is received in a cam slot 117. As the carriage 102 is moved to the right by the cable cylinder 111, the follower 116 is moved along the slot 117 and causes the rod 113 of each feeding device 101 to be moved slidably within the bearings 112—112 away from its associated mandrel 32.

Figure 6:
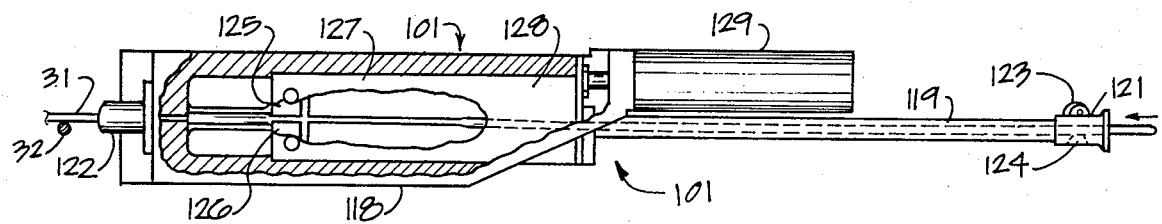
FIG. 6 is a detail view of one of a plurality of feed nozzles for feeding a supply of cordage into engagement with an associated mandrel in the cord-coiling station.

The cordage-feeding device 101 associated with each of the mandrels 32—32 is best seen in FIG. 6. It includes a housing 118 having a tube 119 with a flared inlet 121 at the cordage-input end and a feed nozzle 122 at the output end thereof. The feeding device 101 further includes an eccentrically mounted snubber 123, which cooperates with a block 124 to prevent retrograde movement of the cordage 31. The cordage 31 extends through the housing 121 between the block 124 and the snubber 123 and between an opposed pivotally mounted pawl 125 and an anvil 126, which are adjustable to grip slightly the cordage between. The pawl 125 and the anvil 126 are mounted at end portions of plates 127—127 which are movable reciprocally by a piston rod of an air cylinder 129. The cordage 31 gripped therebetween is moved to the left as viewed in FIG. 6 into engagement with the associated mandrel 32. A portion of the apparatus 100 to be described hereafter causes the levers 87—87 of the workholder 42 in the cord-coiling station to be moved pivotally to cause the end portions 89—89 thereof to clamp the leading end portions of each supply of the cordage 31 in engagement with the mandrels 32—32. Then the air cylinder 129 is operated to withdraw each feed nozzle 122 to the right as viewed in FIG. 6 for another cycle of operation.

Figures 7, 8:
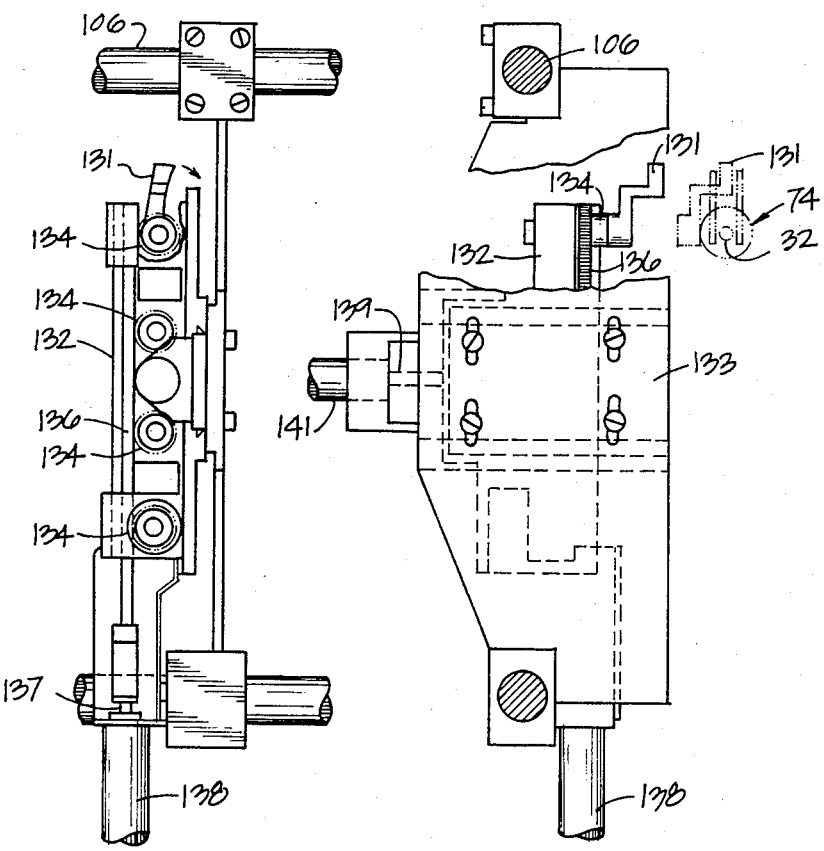
FIGS. 7 and 8 are side and end elevation views, respectively, of facilities in the cord-coiling station for actuating facilities for clamping leading end portions of the cordage.

The portion of the apparatus 100 which causes the clamping of the leading end portion of the cordage 31 with the associated mandrel 32 is best seen in FIGS. 4, 7 and 8. A plurality of cranks 131—131 are mounted individually and pivotally on a bar 132 which is attached to a plate 133. A pinion 134 is attached to the end portion of each of the cranks. In order to turn the cranks 131—131 in unison, a rack 136 is juxtaposed to the bar 132 such that the serrations thereof intermesh with the gear teeth of the pinions 134—134. The rack 136 is connected to a piston rod 137 extending from an air cylinder 138. Operation of the air cylinder 138 causes the rack 136 to be moved upwardly, as viewed in FIGS. 7 and 8, thereby moving rotatably the pinions 134—134 to turn pivotally the cranks. The cranks 131—131 (which are aligned vertically in FIG. 4) are spaced from the arms 81—81 of the associated mandrels 32—32.

In order to clamp the leading end portions of each supply of the cordage 31 with the associated mandrel 32, the arms 81—81 must be turned clockwise, as viewed in FIG. 5, by the cranks 131—131. To facilitate the engagement of the cranks 131—131 with the arms 81—81, the support plate 133 is attached to and supported from a piston rod 139 extending from an air cylinder 141. The operation of the air cylinder 141 causes the plate 133 to be moved to the right as viewed in FIG. 7 to dispose the cranks 131—131 adjacent the associated ones of the arms 81—81. Then the air cylinder 138 is operated to move slidably the rack 136 to cause the cranks 131—131 to be moved into engagement with the portions 83—83 (see FIG. 5) of the arms 81—81 and to cause the ends 89—89 of the levers 87—87 to clamp the leading end portions of the cordage. Following the clamping of the leading end portions of the cordage 31, the carriage 102 is caused to be moved to allow a plurality of convolutions of cordage to be wound on each mandrel. If desired, the convolutions may be spaced apart.

Figure 10:
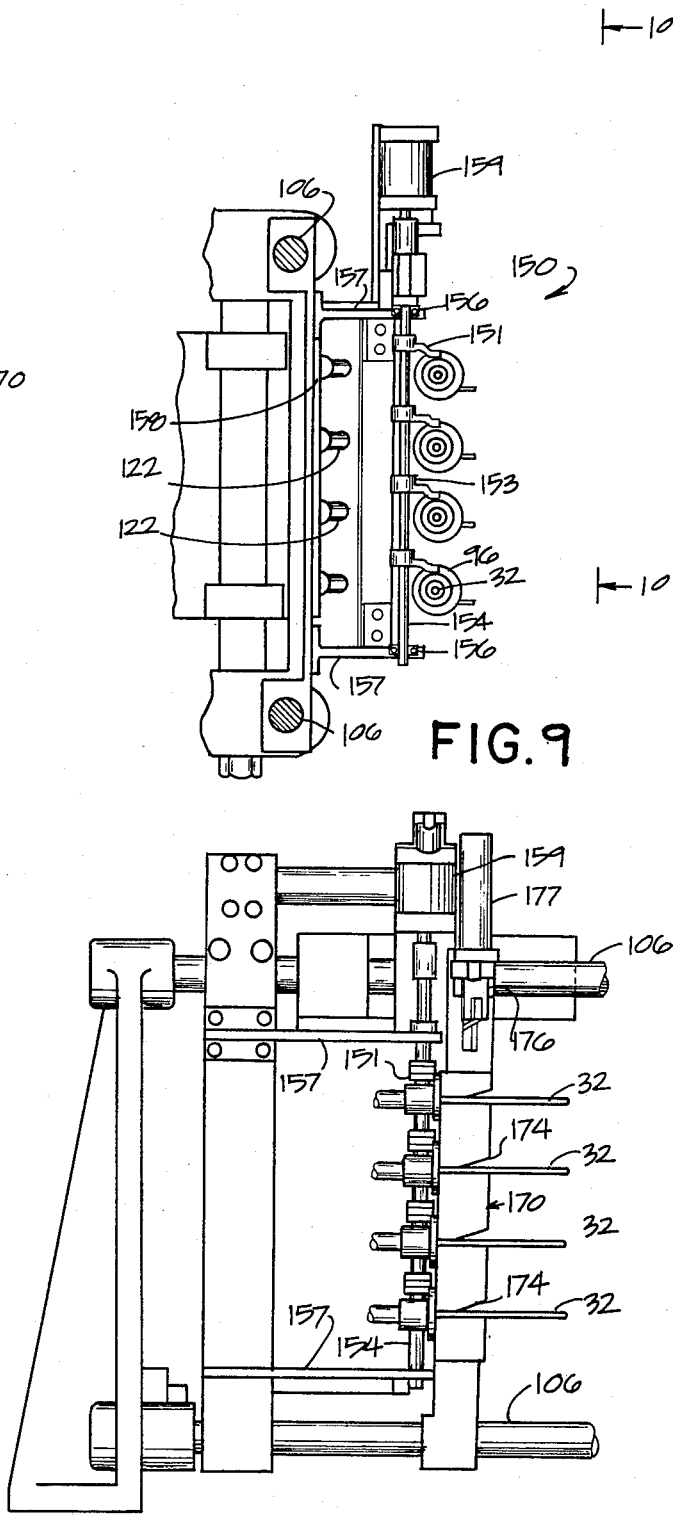
FIG. 10 is a side elevational view taken along lines 10—10 of FIG. 9 and showing further the facilities for actuating the trailing end clamping facilities and a device for severing the wound cordage from the associated supplies.

Further, the apparatus 40 includes a device, designated generally by the numeral 150 and best seen in FIGS. 9 and 10, for causing the clamp assembly 91 which is associated with each mandrel 32 to engage trailing end portions of the wound cordage 31. A plurality of forked fingers 151—151 extend from bushings 153 connected to a vertical shaft 154 that is rotatably mounted on spaced bearings 156—156 held in brackets 157—157 cantilevered from a portion 158 of the frame in which the rods 106 and 107 are supported. An upper end of the shaft 154 is operatively connected to a rotary air cylinder motor 159. When operated, the motor 159 causes the shaft 154 to be turned through 90° to move the fingers 151—151 into engagement with the hubs 96—96 of the associated clamp assemblies. The end portions 97—97 of the hubs 96—96 are moved over the last one or ones of the convolutions of the wound cordage 31 on each of the mandrels 32—32 to secure the trailing end portions to the mandrels.

Following the completion of the traverse of the carriage 102, and the operation of the clamp assemblies 91—91, it becomes necessary to sever the cordage 31 wound on each mandrel 32 from its supply. When the carriage has completed the traverse of the mandrels 32—32, the cord-feeding device 101 is in the position shown in phantom at the right of FIG. 4.

Figure 11:
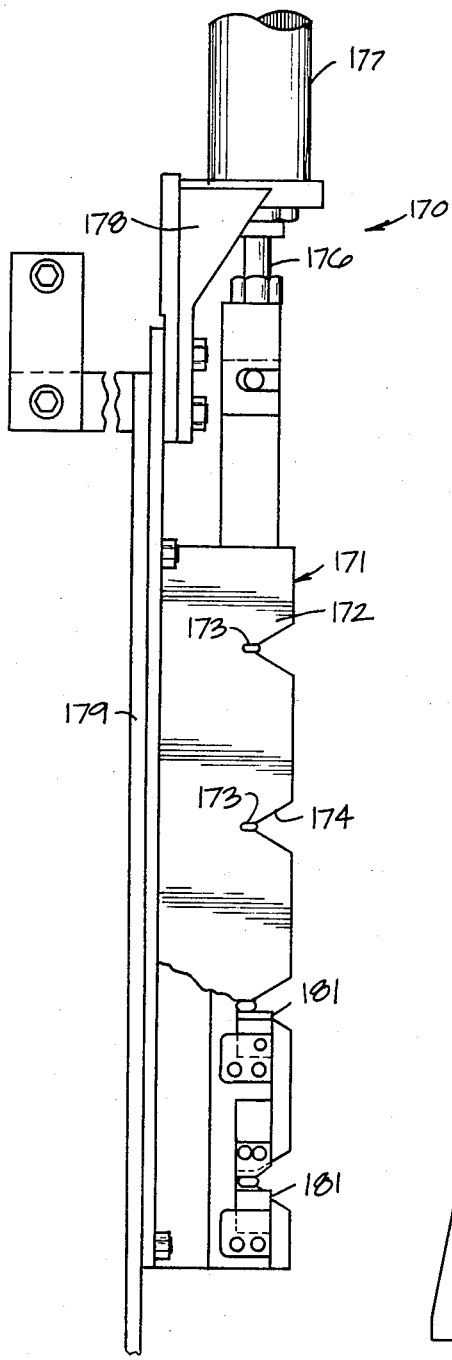
FIG. 11 is an enlarged elevational view of the cordage-severing device.

The severence of the cordage 31 associated with each mandrel 32 is accomplished by apparatus shown in FIGS. 10 and 11 and designated generally by the numeral 170. The severing apparatus 170 includes two similarly constructed severing devices 171—171 each of which includes a slidably mounted plate 172 having a plurality of cordage-receiving slots 173—173 formed therein with each slot having a flared opening 174. Each plate 172 is attached to a piston rod assembly 176 extending from an air cylinder 177 mounted on a bracket 178 attached to a portion 179 of the frame. Adjacent to each plate 172 are a plurality of blades 181—181 that are attached to a stationary plate, which is connected to the portion 179. With cordage 31 associated with each mandrel 32 extending through each of the slots 173—173, the movement of the plate 172 by the air cylinder 177 causes the blades 181—181 to sever the cordage. Because of its resilience, each newly formed trailing end portion of the cordage 31 whips about the mandrel 32 in a counterclockwise direction until it extends to the right as viewed in FIG. 9. The leading end of the cordage extends in the same direction.

It was mentioned hereinabove that the apparatus 170 includes two cordage-severing devices 171—171. The severance of cordage 31 will cause conductors of the cordage to be moved slidably within the cord jacket such that the severed ends of the conductors are not flush with the severed end of the jacket. This undesired foreshortening of the conductors occurs because of the development of tension in the cordage 31 as it is being wound onto each mandrel 32. This would require that an operator separate that unfilled end portion of the jacket extending beyond the conductors prior to the termination of the wound cord. By using two of the devices 171—171, each length of the wound cordage 31 is severed from the supply in a delayed sequence of operations of the first of two air cylinders 177—177. The second air cylinder is operated to sever the cordage at a second location spaced a predetermined distance upstream from the first line of cut. This delay provides the necessary time for the conductors to move relative to the jacket. The predetermined distance is sufficient to separate out the portion of the jacket which has been vacated by the conductors.

Subsequent to the coiling of cordage 31 on mandrels 32—32 of each workholder 42, the conveyor 41 is indexed to advance each group in a counterclockwise direction as viewed in FIG. 3 through dual heating stations. Apparatus, designated generally by the numeral 190, is provided for applying both inductive and radiant heat to the mandrels and to the wound cordage, respectively. The coiled cordage 31 is heated beyond the transition temperature of plastic jacketing material. Subsequently, when the coiled cordage is cooled, the coiled configuration becomes permanent.

In order to obtain optimum retractility of the cords, the mandrels 32—32 are preheated and the cordage itself is subjected to infrared heating. In a first station of the heating apparatus, the mandrels 32—32 are heated inductively by coils 191—191, which are mounted adjacent to the mandrels (see FIG. 2). The coils 191—191 which are comprised of a copper tubing having cooling water flowing therethrough, are operated to establish a magnetic field which elevates the temperature of each of the mandrels 32—32. This arrangement is effective in reducing the amount of temperature lag at the cord-mandrel interface behind that at the outwardly facing surfaces of the convolutions of the cords. A radio frequency induction heating system operating in a range of frequency of 300-450 KHz is available commercially from Lipel Company of Long Island, N.Y. The range of frequency is selected to be suitable to heat only the material of the mandrels 32—32 and not the plastic material of the cords.

An apparatus, designated generally by the numerals 192, is operated to apply infrared heat to the coiled cordage on each one of a group of mandrels. The apparatus 192, which extends along the conveyor 41 includes a plurality of banks of heating elements. As each workholder 42 is advanced through the heating zone, each mandrel is caused to be turned to increase the uniformity of the heating.

Following the heating of the cordage 31, each workholder 42 is advanced through the ambient atmosphere and then through the cooling station 47. The cooling station 47 includes apparatus which moves chilled air across the surfaces of the convolutions of the cordage 31.

After the wound cordage 31 has been heated, cooled and removed from the apparatus disclosed hereinbefore, it is severed at least at one predetermined location along its length which has been established to provide at least two retractile cords 35 and 36 of predetermined lengths (see FIG. 1B). The retractile cords 35 and 36 include newly formed end portions 38 and 39, respectively. Presently, twelve foot length cords are made on the apparatus 30 and are severed to provide two six foot retractile cords. It should be understood that the length of parent cordage could be severed to provide two or more cords each of which has a predetermined length (see FIG. 1D). Should the parent cordage be cut to provide more than two offspring cords, those other than the two including the original leading and trailing end portions each will have two newly formed end portions. For example, in FIG. 1D the length of 30 of cordage 31 has been cut at two locations to provide three retractile cords 193, 194 and 195. The retractile cord 193 includes the original leading end portion 33 and a newly formed trailing end portion 196, while the cord 195 includes a newly formed leading end portion 197 and the original trailing end portion 34. The cord 194 includes newly formed leading and trailing end portions 198 and 199.

Figure 12:
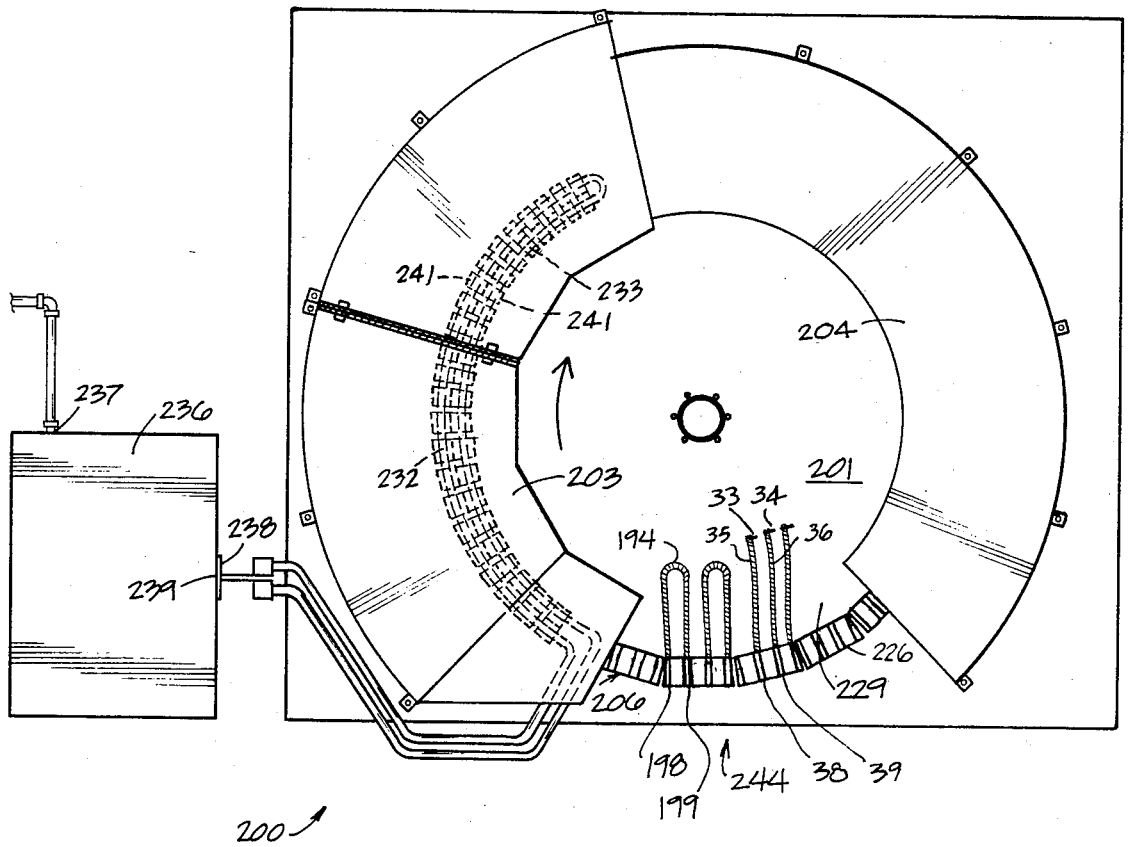
FIG. 12 is a plan view of an apparatus for annealing a newly formed end portion of each of a plurality of retractile cords.

Then each retractile cord is processed through an apparatus which is designated generally by the numeral 200 (see FIG. 12) and which is used to anneal the end or ends of each of the cords. This is done in order to allow each cord end to be terminated with a modular plug 37 such as that disclosed and claimed in priorly identified U.S. Pat. No. 4,158,316.

The apparatus 200 includes a turntable 201 which is driven by a variable speed motor (not shown) such that the turntable is indexed continuously through a heating zone 203 and a cooling zone 204. In order to hold the retractile cords which are cut from the length 30 of parent cordage 31, the turntable 201 includes a pallet 206 which is arcuately disposed about the periphery of the turntable.

For the preferred embodiment, the pallet 206 is made of aluminum and is segmented. The pallet 206 includes an angle portion 216 (see FIG. 13) having a horizontal leg portion 217 attached to the underside of the turntable 201. An upstanding leg 221 of the angle portion 216 may be insulated from the turntable 201 by a spacer 222.

Attached to the vertical leg 221 are a plurality of segments 226—226 (see FIGS. 12-14) having portions 228—228 which are spaced apart to form slots 227—227 therebetween. Also, each of the slots 227—227 has a width which is slightly less than the outer diameter of the jacketed cordage 31. A top edge of the leg 221 is disposed below the inverts of the slots between the segments 226—226.

Figure 13:
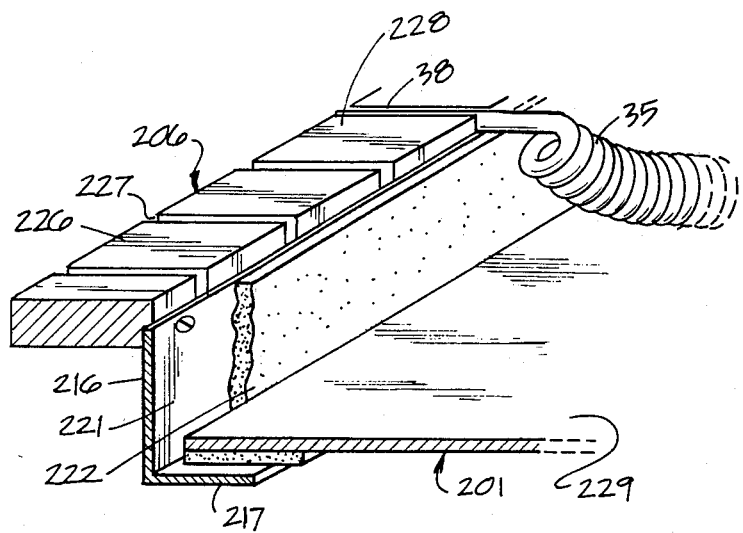
FIG. 13 is a detail view of a portion of the apparatus of FIG. 12.

An operator attending the turntable 201 positions the retractile cords on an upper surface 229 such that a newly formed end portion, e.g. 38, of each cord is received in one of the slots 227—227 (see FIG. 13). In the event that three or more cords are made from each parent cord, the intermediate cords would have both ends positioned in the slots 227—227 (see FIG. 12) inasmuch as each newly formed end must be annealed. For example, both newly formed end portions 198 and 199 of the cord 194 are positioned in slots 227—227.

Figure 14:
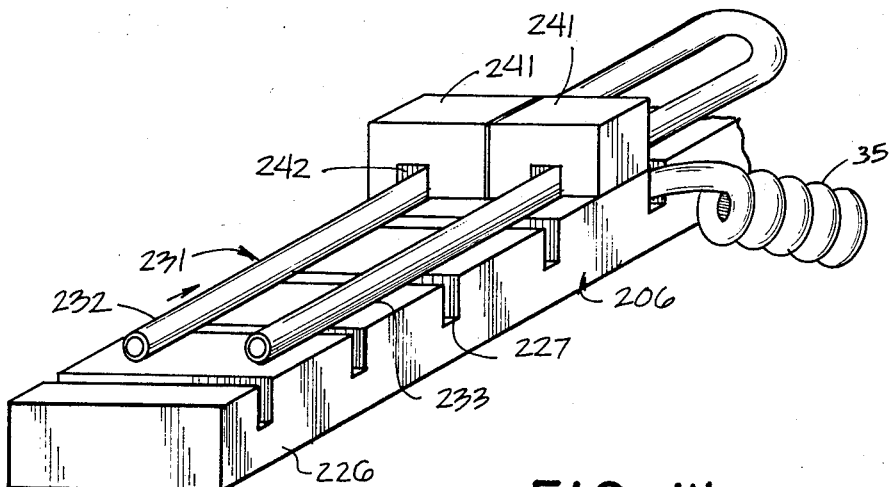
FIG. 14 is an enlarged view of a portion of a heating zone of the apparatus of FIG. 12.
Figure 15:
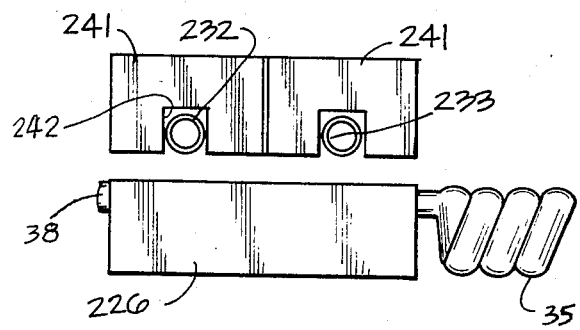
FIG. 15 is an end view of the portion of the apparatus shown in FIG. 14.

Disposed above the segments 226—226 within the heating zone 203 is an induction coil 231 in the form of a copper tube having a supply leg 232 and a return leg 233 (see FIGS. 14 and 15). The coil 231 is in close proximity to the pallet 206 and is connected at its ends to a rubber hose which is braided with copper. The rubber hose carrier water from a supply and the copper braid provides a radio frequency connection to the copper tube. The braided rubber hoses are connected to a 10 kilowatt RF generator 236 (see FIG. 12) such as one marketed by Pillar Corporation of Milwaukee, Wis. under the designation AB1553-1. The RF generator 236 has a water supply inlet 237 and two output ports 238 and 239 which are connected to the braided hoses. Preferably, the frequency of the generator 236 is such that heat transfer is only caused to be made into the outer surface portion of the aluminum portions 228—228 of the segmented pallet.

The heating station 203 includes provisions for concentrating the heat transfer into the end portions only of the retractile cords on the turntable 201. These provisions include a plurality of flux concentrators 241—241 each of which includes a slot 242. Each flux concentrator 241 is made of powdered iron which is bound with a resinous material.

The concentrators 241—241 are positioned over the supply and return legs 232 and 233 of the induction coil 231 such that they are spaced above the segments of the pallet 206. The flux concentrators 241—241 are continuous along each leg of the coil with those on one leg of the coil being in close proximity to but spaced from these on the other coil (see FIGS. 14 and 15). Also, it should be observed from FIG. 15, that the sides of the flux concentrators 241—241 are aligned with the sides of the segments 226—226. This arrangement concentrates the heat energy into the segments 226—226 and hence only into the end portions of the cords.

The retractile cords on the turntable 201 are indexed continuously through the heating zone 203 with at least one end portion of each cord being exposed to heat for a period of about three to four minutes. Advantageously, the radio frequency arrangement provides for the transfer of heat energy from the coil to the cords to be concentrated through the pallet. Electromagnetic induction causes Eddy currents to flow in the pallet 206 thereby heating the cord ends held in the slots 227—227 thereof.

Subsequently, each of the cords is indexed continuously through the cooling zone 204 for a period of about three to four minutes. Cool air is directed from a commercially available air conditioning unit such as one marketed by the Sears, Roebuck Company under the designation Kenmore Model 253-7780890 through ducts and flowed past the pallet 206.

As each cord emerges from the cooling zone 204, an operator at a load-unload station 244 (see FIG. 12) removes it from the turntable and the end or ends thereof from the pallet 206. Both ends of each cord are now straight and adapted to be terminated with modular plugs 37—37.

It is to be understood that the above-described arrangements are simply illustrative of the invention. Other arrangements may be devised by those skilled in the art which will embody the principles of the invention and fall within the spirit and scope thereof.

What is claimed is:

1. A method of making retractile cords, said method comprising the steps of:
    winding a length of cordage helically in a plurality of convolutions onto a workholder, the wound cordage having leading and trailing end portions which are secured to cause the leading and trailing end portions to be maintained straight and to cause the convolutions to be held on the workholder;
    heating and cooling the wound cordage to cause the leading and trailing end portions to be set in a straight configuration;
    removing the wound cordage in a manner to reverse the direction of the helices of the convolutions;
    severing the length of cordage, which has been wound helically in the plurality of convolutions and which has been heat set in a coiled configuration along its entire length between a straight leading end portion and a straight trailing end portion, said step of severing being accomplished at a predetermined location along the length to form a first retractile cord having the straight leading end portion and a newly formed trailing end portion, and a second retractile cord having the straight trailing end portion and a newly formed leading end portion;
    holding the newly formed trailing and leading end portions of the first and second cords in a straight configuration; and
    annealing the newly formed trailing end portion of the first cord and the newly formed leading end portion of the second cord to cause each of the newly formed end portions to be retained in a straight configuration which is suitable for termination with a modular plug.

2. The method of claim 1, wherein said step of annealing includes the step of inductively heating the newly formed end portions.

3. The method of claim 2, wherein heat energy is directed in a concentrated manner into the end portions of the cordage which are held in the straight configuration.

4. The method of claim 1, wherein said step of severing includes severing the length of cordage at two predetermined locations to provide three cords and wherein one of the three cords includes two newly formed end portions.

* * * * *